April 19, 1949.  V. E. MEHARG ET AL  2,467,440
AUTOMATIC PLASTIC MOLDING PRESS
Filed Dec. 30, 1943  3 Sheets-Sheet 1

INVENTORS
VIRGIL E. MEHARG
ARTHUR P. MAZZUCCHELLI
RICHARD E. NICOLSON
BY
ATTORNEY

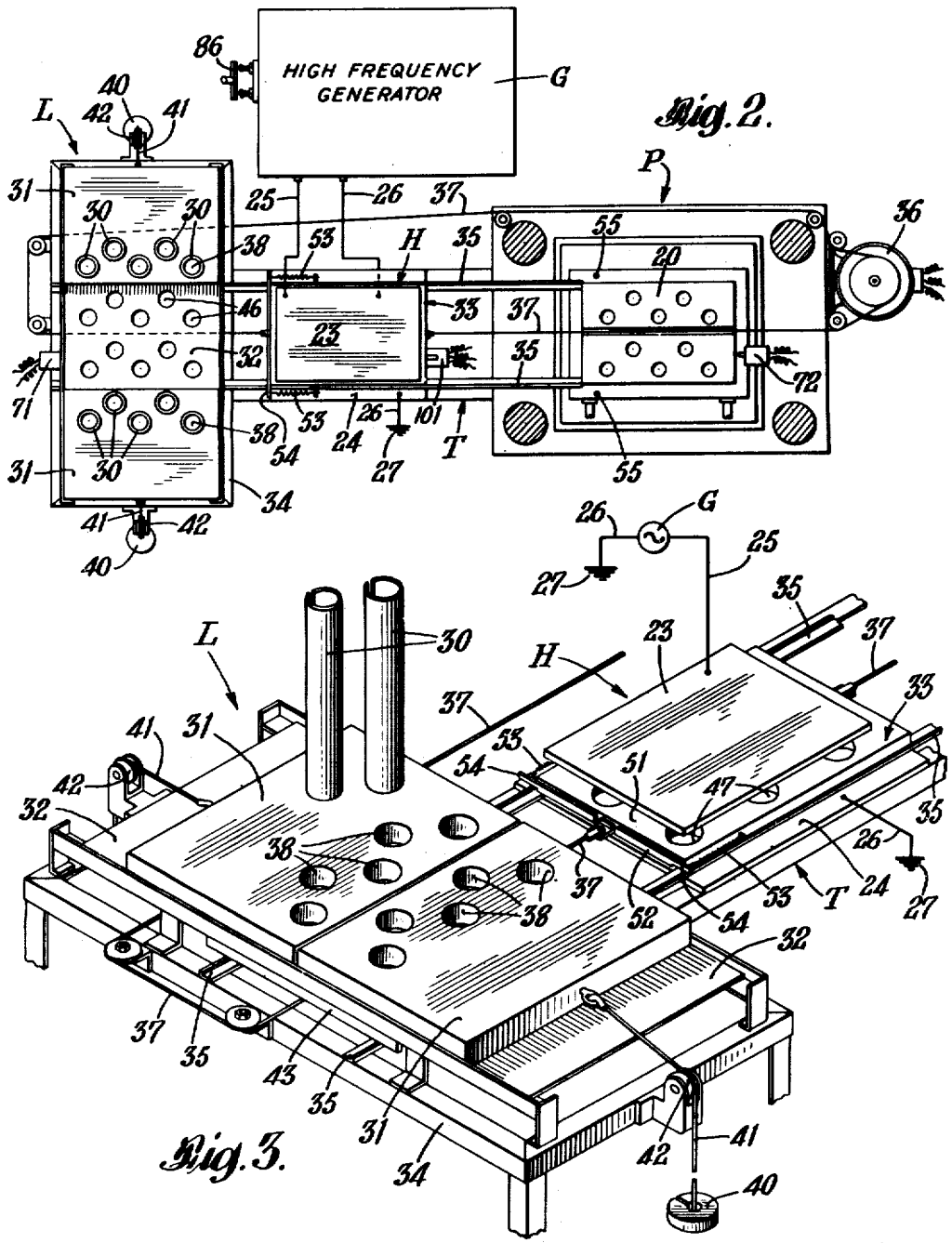

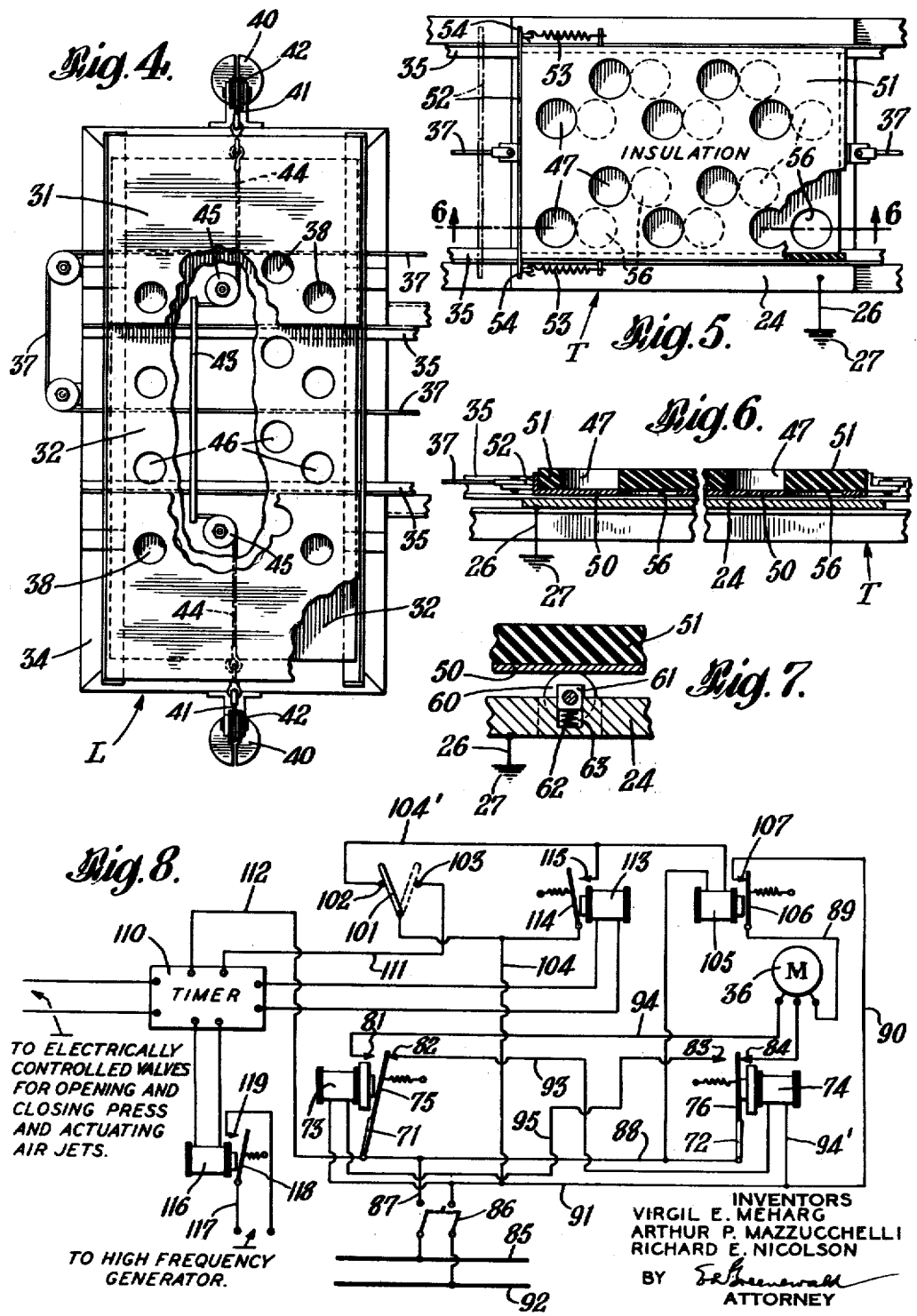

Patented Apr. 19, 1949

2,467,440

UNITED STATES PATENT OFFICE 2,467,440

AUTOMATIC PLASTIC MOLDING PRESS

Virgil E. Meharg, Arthur P. Mazzucchelli, and Richard E. Nicolson, Bloomfield, N. J., assignors to Bakelite Corporation, a corporation of New Jersey Application December 30, 1943, Serial No. 516,166

4 Claims. (Cl. 18—17)

This invention relates to apparatus for molding plastic materials involving heating to bring to a moldable plasticity.

Heat-molded plastics are of two types (1) thermosetting which become infusible or harden by heating during the molding operations, and (2) thermoplastic which require cooling of the mold for solidification. The first type presents the problem of avoiding objectionable curing or setting of the plastic to the infusible non-flowing condition during a preliminary heating by conduction, as in an oven, to molding temperature before charging into a mold; and the second type, with few exceptions, cannot be brought to molding temperature by conduction heating without objectionable breakdown and discoloration. Common to both types, moreover, is the further problem of charging the heated material into a mold without objectionable changes occurring in the material and without loss in plastic flow and moldability.

According to the present invention both types can be successfully handled to yield molded pieces having satisfactory surface appearance, strength, etc.; it provides, furthermore, a type of heating that brings the second or thermoplastic type, requiring cooling in the mold to set the plastic, within a molding time cycle approaching that of thermosetting plastics. These results are dependent upon (1) generating heat within the charge preliminary to molding by applying a high frequency electrostatic field, (2) transferring a so-heated charge to the mold, (3) closing the mold and applying pressure, (4) holding the charge in the mold (a) in the case of thermosetting plastics under heat and pressure until the plastic is set, and (b) in the case of thermoplastics under pressure in a cooled mold until set, and (5) opening the mold and ejecting the molded piece. By the inclusion of the preliminary heat generation the molding time cycle can be greatly accelerated by the generation of heat in one or more additional charges during the molding of the first charge; and this is made possible because the period for bringing to molding temperatre by a high frequency field can be synchronized with the molding time.

The rate at which the heat is generated, or the rate at which the temperature rises, is controlled by the power input; suitable frequencies for this purpose range from 1 to 100 megacycles, and the power input lies in the region between 0.6 to 50.0 watts per gram of material. The field is most readily applied to a molding charge by preforming a charge into a flat disc and placing the preform between two conductive plates connected by leads to a high frequency generator. It is advisable to surround the preform by a ring of low dielectric loss material, such as glass, ceramics, lead-bonded mica, mica filler bonded by phenol-formaldehyde resin, etc., to confine the generated heating to the preform and not include the surrounding air. It is sometimes desirable, however, to have an enclosing medium that is not a good dielectric, since the heat generated therein can be retained for subsequent heating operations, and thus the medium acts to compensate for differences in the surface heating or for loss of heat to the contacting air.

The above recited steps occur in the sequence given, and some of them, such as steps (3) and (5), can be manually performed. It has been found, however, that so much improvement can be attained in speed and uniformity of results by an automatic cyclic operation as to radically change the process and open it to molding speeds not attainable by manually-operated steps. This is due to the fact that a relation exists between the temperature to which a charge is brought and the allowable holding time; the relation between temperature and holding time can be expressed by the equation:

$$T = k \log ct$$

where T is the temperature, $t$ is the maximum permissible holding time and $k$ and $c$ are constants. The importance of the relation rests on the fact that costs can be materially reduced by cutting the molding time, and the higher the temperature to which a charge is brought the less is the molding time period. For instance, a typical thermosetting material at 140° C. was held at that temperature for 50 seconds, at 150° C. for 31 seconds and at 160° C. for 19.5 seconds before it lost its flow (or, in other words, began to set); but at 170° C. the period was cut to 12.5 seconds or to one-fourth that at 140° C. Within a period of only 12.5 econds, however, it is not practically feasible to manually transfer a heated charge to a mold, close the mold and apply pressure to cause plastic flow with complete filling of the mold before setting, for slight variations in the timing of these operations show up in the molded pieces in the way of precuring, surface apearance, non-uniformity, etc. But automatic control permits even faster molding cycles than these with consequent saving in costs.

An automatic operation further can be modified to provide an overlapping of complete heating and molding cycles to care for the different speeds at which different plastics or different batches of the same type plastic harden, or for the kinds of molding dies used, or for the character and distance of flow of a mold, or for molding pressures applied, or for other modifying factors. Moreover, it is the die and press assembly, changed for each kind of molded article, that constitutes the principal item of cost in a molded piece; and a further reduction in this item is obtained by the overlapping of the cycles because more molded pieces can be produced within a given time. Possibilities in this direction by the overlapping of cycles are disclosed by the following tables in which the simultaneously overlapping portions of a plurality of cycles are given as applied to a thermosetting material.

In Table I there is shown the overlapping of two complete cycles, the material of cycle B being brought to temperature while that of cycle A is transferred and molded.

*Table I*

| Step | | Cycle A | Cycle B |
|---|---|---|---|
| | | Seconds | Seconds |
| 1 | Heating | | 30 |
| 2 | Transferring | 4 | |
| 3 | Closing | 4 | |
| 4 | Hardening | 20 | |
| 5 | Opening and ejecting | 7 | |
| | Total | 35 | 30 |

By the overlapping of two cycles a complete heating and molding cycle is reduced from 65 seconds to 35 seconds.

The overlapping of more than two cycles to secure a further reduction in time is made possible by providing more than one heat-generating stage or by extending the high frequency field area so as to create heat in more than one charge during a cycle, as shown in the following:

*Table II*

| Step | | Cycle A | Cycle B | Cycle C |
|---|---|---|---|---|
| | | Seconds | Seconds | Seconds |
| 1 | Heating | | 25 | 10 |
| 2 | Transferring | 2 | | |
| 3 | Closing | 4 | | |
| 4 | Hardening | 12 | | |
| 5 | Opening and ejecting | 7 | | |
| | Total | 25 | 25 | 10 |

According to this arrangement the heat-generating period for any one charge is increased to 35 seconds by the two stages of heating for 10 seconds and then for 25 seconds, with corresponding increase in molding temperature and a decrease in the molding time to 25 seconds.

In fact with an automatic control the steps can be timed so that a thermosetting material is advanced by heating to the point where it just retains the flow necessary to completely fill the mold. For example, with an increase in the number of overlapping cycles a greater reduction in molding time is obtainable as shown by the following:

*Table III*

| Step | | Cycle A | Cycle B | Cycle C | Cycle D | Cycle E |
|---|---|---|---|---|---|---|
| | | Sec. | Sec. | Sec. | Sec. | Sec. |
| 1 | Heating | | 9 | 9 | 9 | 7 |
| 2 | Transferring | 1 | | | | |
| 3 | Closing | 1 | | | | |
| 4 | Hardening | 5 | | | | |
| 5 | Opening and ejecting | 2 | | | | |
| | Total | 9 | 9 | 9 | 9 | 7 |

The arrangement gives a total heating period to any one charge of 34 seconds and a molding period of 9 seconds; but a charge is molded every 9 seconds in the same mold.

Even faster cycles are possible in correspondence to the decrease in plastic flow required; the technic applies particularly to simple shapes that require a slight flow. What is more, it has been found by operating at high speed cycles that temperatures above decomposition temperatures (375°–500° F.) can be used for molding which enable a further decrease in the molding or curing time to approach that of a hot-stamping operation, and this with but one heating stage. A wholly unexpected effect is an actual increase in the torque strength in articles molded under these conditions, and this property is particularly important in bottle caps and similar closures.

Data from comparative tests in support of the foregoing statements are noted in the following Table IV. The tests were made with two different types of thermosetting molding materials on a 28 mm. bottle closure mold requiring a charge of 10 grams. The first material was one containing about equal parts of wood flour filler and a two-step resin that consists of a novolak phenol-formaldehyde resin and enough hexamethylene-tetramine to harden it and had a relatively slow set time of 100 seconds at 300° F. and 1000 pounds per square inch. The second material used was one containing about equal parts of wood flour filler and equal parts of a one-step alkali-catalyzed phenolic resin; the resin had a relatively fast set time of 65 seconds at 300° F. and at 1000 pounds per square inch pressure. Tests made in accordance with the usual procedure of charging a cold preform into a mold and subjecting to heat and pressure are labeled "standard" in the table, and tests with a preliminary high frequency heating to molding temperature are labeled "H. F." with the time period of preliminary heating; the closing time is the length of time required for the mold to close under the applied pressure, i. e. for fusion and flow of the molding material in the mold, and the cure is the minimum time required for setting to the infusible form.

*Table IV*

| Test | Material | Method | Pressure, p. s. i. | Molding T., °F. | Closing, sec. | Cure, sec. | Torque inch-lb. |
|---|---|---|---|---|---|---|---|
| 1 | Slow setting | Standard | 22,000 | 320 | 5 | 50 | 56 |
| 2 | do | H. F. 10 sec | 22,000 | 320 | 1 | 20 | 77 |
| 3 | do | Standard | 22,000 | 410–430 | 3 | | |
| 4 | do | H. F. 10 sec | 22,000 | 410–430 | 1 | 7 | 75 |
| 5 | do | H. F. 12 sec | 25,000 | 410–430 | 1 | 3–5 | |
| 6 | Fast setting | Standard | 22,000 | 320 | 5 | 60 | 98 |
| 7 | do | H. F. 14 sec | 22,000 | 320 | 1 | 30 | 51 |
| 8 | do | Standard | 22,000 | 410–430 | 4 | 45 | 63 |
| 9 | do | H. F. 13 sec | 22,000 | 410–430 | 1 | 10 | 57 |

In explanation of the cure of test 3 using decomposition temperatures, a series of curing times ranging from 5 seconds to 60 seconds were tried, but all the caps blistered due either to undercure or decomposition; as shown by tests 4 and 5 the H. F. method was effective at the high or decomposition temperatures to yield satisfactory molded pieces with no material drop in the torque strength. A surprising result, however, is that the slow-setting material gave pieces of much higher torque value by the H. F. method than by the standard, but the fast-setting material gave pieces by the H. F. method of much less torque value than by the standard; in the latter case there was, however, an improvement in torque value of pieces molded by the H. F. method at high temperature, and a marked drop in value in pieces molded by the standard method at high temperatures. A further surprising fact was that the slow-setting material by the H. F. method had a permissible minimum cure of 3–5 seconds, while the fast-setting material had a minimum cure of 10 seconds at high temperatures.

Particularly effective is the application of the H. F. method to the molding of urea resin molding compositions of any thickness. These materials are very heat-sensitive, and the temperature range between undercure and overcure is but a few degrees; accordingly they are limited by the standard method to relatively thin pieces of uniform wall thickness in the neighborhood of about ⅛ inch. This was demonstrated by the molding of 4 inch discs of uniform ½ inch thickness; by the standard method at 2,700 p. s. i. a 15 minute cure at 290° F. or a 3 minute cure at 310° F. gave undercured and blistered pieces, and a 5 minute cure at 310° F. gave a piece that was badly decomposed and overcured on the surface; by applying H. F. heating to the preform for 50 seconds to raise it to 310° F. and then molding at that temperature and the same pressure of 2,700 p. s. i. for 75 seconds a molded disc was obtained free from blisters, internal undercure or surface overcure. This disc has aged for one year and is still free from cracks and internal opalescence.

A situation, parallel to thermosetting materials, exists with regard to thermoplastic materials with the exception that the molding time is controlled by the speed at which the material can be hardened by cooling in the mold. Here again any one charge can be passed through one or more heat-generating stages over a time period permitted by the material before breakdown or discoloration occurs in order to reach the temperature for flow to fill the mold under the applied pressure. The hardening can be accelerated by maintaining the mold at a low temperature that just permits filling and then causes hardening.

An apparatus for carrying out the foregoing process is illustrated in the accompanying drawing in which Fig. 1 is an elevation of an apparatus incorporating mechanism for the four stages of (a) loading, (b) heating, (c) transferring, and (d) molding;

Fig. 2 is a horizontal cross-section on the line 2—2 of Fig. 1;

Fig. 3 is a perspective showing the mechanism for the loading and heating stages;

Fig. 4 is a top view of the feed plates and attached mechanism;

Fig. 5 is a plan view of the loading board carriage;

Fig. 6 is an enlarged vertical cross-section on line 6—6 of Fig. 5 with the middle portion broken away;

Fig. 7 is an enlarged detail of a fragment of Fig. 6; and

Fig. 8 is a wiring diagram of control circuits and associated elements included in the assembly shown in Fig. 1.

Figure 1:
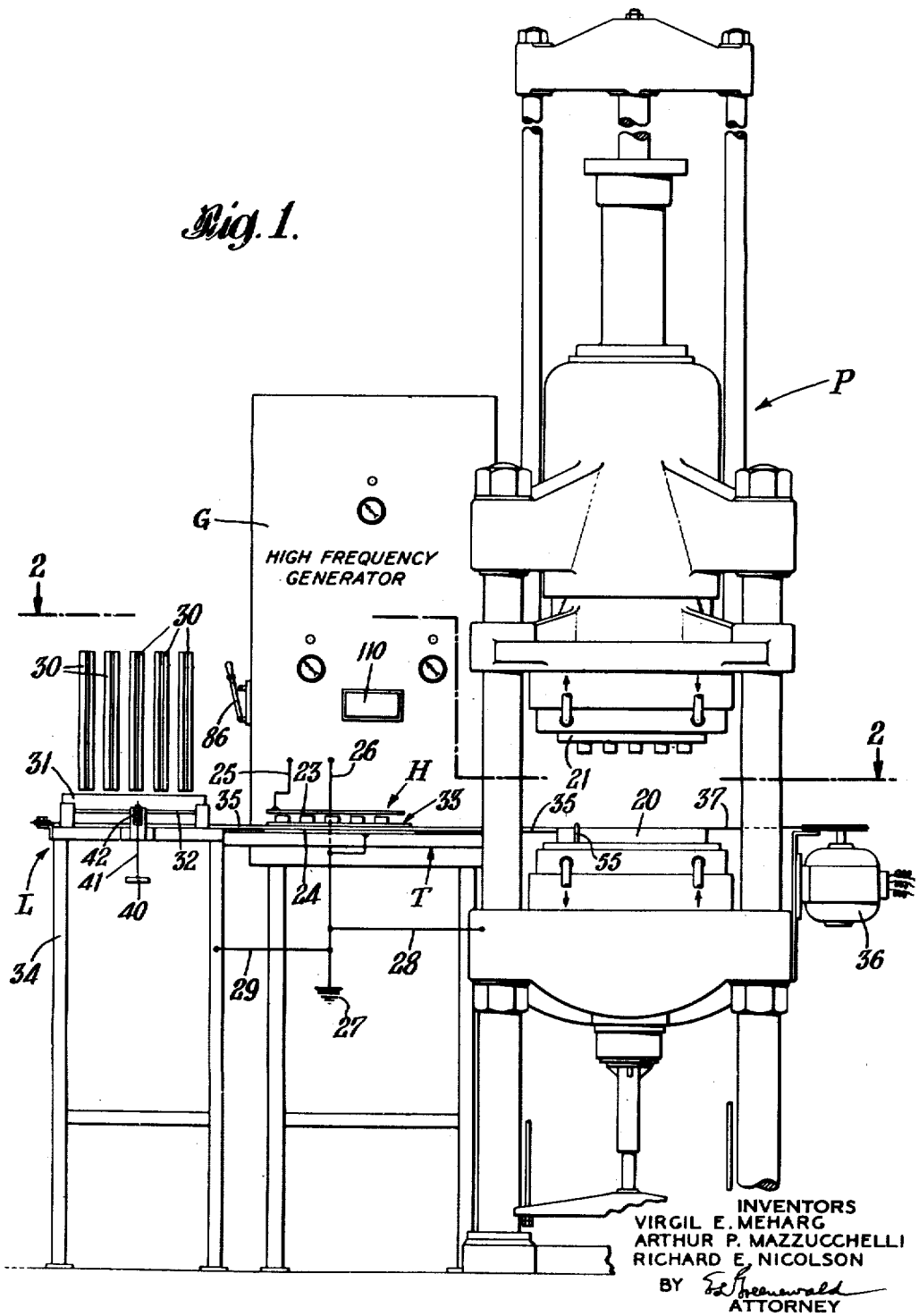

The embodiment illustrated in Figs. 1 to 7 inclusive incorporates a molding press P, a loading mechanism L, and, interposed between the press and the loading mechanism, a heat-generating arrangement H to which is connected a high frequency generator G; connecting the stations L, H and P is a transferring mechanism T. The press P is a standard form of an hydraulically operated press; and as shown it includes a ten cavity steam-cored disc mold consisting of a chase 20 and a plunger or force 21. The heat-generating element H consists of spaced electrostatic plates 23, 24 connected by leads 25 and 26 to the generator G; the lead 26 is also connected to ground 27, to the press P and to the loading mechanism L by the conductors 28, 29. The loader L comprises charging tubes 30, for filling with preforms and feed plates 31, shown in open position in Figs. 2, 3 and 4, which slide on a sealing plate 32. The transfer mechanism T includes a loading carriage 33, which travels underneath the sealing plate 32 at one end of its journey, and tracks 35 on which the loading carriage travels back and forth between the loader L and the press P; the carriage is operated by a motor 36 through the continuous cable 37. The elements are supported on a frame 34.

The feed plates 31 of the loader L are normally separated by weights 40 on the ends of cables 41 operating over pulleys 42 and attached to the feed plates 31 which have in them through cavities 38; and in the separated position of the plates (Fig. 2) the cavities 38 are in position under the charging tubes 30 to receive preforms or charges. When the loading carriage 33 is being drawn by the cable 37 into position below the sealing plate 32, determined by contact with a switch 71 that acts as a stop, it strikes a bar 43 (Fig. 4) connected by cables 44 running over pulleys 45 and attached to the feed plates 31; by this means the loading carriage serves to close the feed plates as it moves beneath the sealing plate 32 as shown in Fig. 3 (which also shows the carriage in a second position between the electrodes). In the sealing plate 32 are through cavities 46 (Fig. 2) in position to receive the preforms from cavities 38 in the closed feed plates; cavities 46 are also in vertical alignment with cavities 47 in the loading carriage 33, when the latter is in receiving position, so that the preforms pass through the openings 46 into the cavities 47.

The loading carriage 33 is shown in greater detail in Figs. 5, 6 and 7 and in position over the electrode or condenser plate 24. The carriage consists of a metal base plate 50 on which is supported a non-metallic board 51 having therein the cavities 47. The board 51 is held against a flange 52 on the metal base plate 50 by springs 53 and the flange 52 has projecting ends 54 to which the springs 53 are attached; in this position of the board 51 the bottoms of the cavities 47 are closed by the plate 50. The board 51 is made of low-loss insulating material, and its thickness is such that when the cavities 47 are loaded with preforms, the preforms extend somewhat above the board; the cavities 47 are of a diameter sufficiently larger than that of the preforms to permit the slight swelling that occurs when heat is generated in them between the condenser plates, and the board itself becomes heated to some extent which prevents chilling of the preform surfaces while confining the heating to the preforms. The cable 37 which moves the loading carriage back and forth is attached to the board 51 and not to the plate 50. Mounted on the press (shown in Figs. 1 and 2) are vertical projecting pins 55 in position to engage the extensions 54 with the result that, when the loading carriage is drawn over the chase 20 of the mold, the plate 50 is stopped and the board 51 slides over the plate 50; this action results in bringing the cavities 47 over openings 56 in the plate 50. Further movement of the board 51 over the plate 50 is checked by a switch 72 (shown in Fig. 2). In these relative positions of the base plate 50 and the board 51, the openings 56 are in alignment with the mold cavities in the chase 20, and the result is the preforms drop into the chase.

When the base plate 50 is in position between the electrodes 23 and 24, it is kept in electrical contact with the electrode 24 by means of a riding ground consisting of metal wheels 60 supported on the electrode 24 by bearings 51 pressed by springs 62 in cavities 63 in the electrode 24. This detail is shown in Fig. 7; the conductive metal base plate 50 thus becomes a surfacing element of the electrode 24 for confining the electrostatic field.

The diagram of Fig. 8 shows the controls and connecting circuits for the automatic operation of the apparatus. Switches 71 and 72 are similar single pole, single throw switches electrically connected so that closing either switch opens the other; these switches are mounted at each end of the travel of the carriage 33 as shown in Fig. 2 and the switches serve as stops for the carrier at each end. The operation is accomplished through a circuit including relays 73, 74; the armatures 75, 76 of relays 73, 74 are shown for simplicity as extensions of the switch arms 71 and 72, and these armatures oscillate between contacts 81, 82 and contacts 83, 84. When the switch arm 72 is thrown to bring the armature 76 into connection with the contact 84 there is a closed circuit from a power lead 85 through a double pole switch 86 to conductors 87, 88, the armature 76, the contact 84 and to the motor 36, with a return from the motor through a circuit including conductors 89, 90, 91 to the other pole of the switch 86 and to the power lead 92; there is also a branch circuit through line 88, armature 75, contact 82, conductor 93, relay 74 and connection 94' to conductor 91 to energize the relay 74 and hold the armature 76 to the contact 84. When the other switch 71 is thrown, the circuit is established through the armature 75, the contact 81 and a conductor 94 to the motor, whereby the rotation of the motor is reversed, and with a branch circuit through the conductor 88, the armature 76, contact 83, a wire 95, the relay 73 and the return 91 to the lead 92 to hold the armature to the contact 81. The motor 36 operating the carriage is a slow-speed motor (100 R. P. M.), and with such a motor speed coupled with the delay due to the inertia of the moving parts, it has been found that there is ample time provision at the reversing stations for the loading and unloading of the carriage; time-delay relays, however, can be inserted in the lines to the motor or a magnetic brake can be applied to the motor to regulate the period of delay if found desirable or necessary.

When the switch 71 is operated to close the circuit through contact 81 to the motor, the carrier 33 starts on its travel toward the molding press. On its way it throws a switch 101 as it comes into position between the heating electrodes; this breaks the contact with a terminal 102 and closes contact with another terminal 103; the contact 102 connected through a line 104 to line 91 and power lead 92, thereby breaking a circuit through a line 104' and about a relay 105 to release an armature 106 and break contact 107 with the line 90 returning to the power lead 85; this stops the motor and leaves the carrier in position for heating the preforms. At the same time the closing of a circuit through contact 103 energizes a timer 110, which is a multiple timing unit, through conductors 111, 112 to the line 88 and power lead 85. The timer after a predetermined delay operates a relay 113 to attract armature 114 against contact 115 and so close the circuit through line 104 to operate relay 105 and start the motor and the carrier on its travel to the press. During the delay at the heating station, the timer 110 has operated a relay 116 closing a circuit 117 through armature 118 and contact 119 and starting the high frequency generator G; after a predetermined time the timer stops energizing the relay 116 and shuts off the generator. There are also connections from the timer to the press valves which are set to open the press, and then close the press after the loading board has traveled to the press, released the preforms into the chase and started on its return through the operation of the switch 72. In its return travel the switch 101 is thrown to contact 102 for a repetition of the cycle. While the carrier is on its return for another loading and heating, the press operates to mold and discharge the molded pieces; the automatic operation of the press by means of electrically-controlled valves and timer is well-known in the art.

A typical time cycle in seconds of operating when the carriage starts the timer 110 at the heating station is as follows:

| Start Timer | Wait | H. F. Heat | Wait | Open Press | Start Motor | Close Press | Stop and Reset Timer |
|---|---|---|---|---|---|---|---|
| 0 | 10 | 52 | 3 | 1 | 1 | 5 | 1 |

Upon the starting of the motor and during the interval of closing the press, the carriage moves to the loader to receive a fresh charge and returns to the heating station where it stops the motor and resets the timer. During the wait at the heating station the charge in the mold is molded and discharged. The total time for the above cycle is 73 seconds.

What is claimed is:

1. Apparatus for the molding of a heat-moldable plastic material having in combination a loader for the material, a press for molding the material, heating means intermediate the loader and the press, a carrier including a board of low loss dielectric material for receiving a charge from the loader and for traversing the heating means and for delivering the charge to the press, and mechanism for causing the traverse of the carrier, said heating means comprising spaced electrodes for establishing a high frequency electrostatic field through which the carrier traverses to bring the charge on the carrier to molding temperature with substantial uniformity within its mass, said carrier providing an electrically-conductive element for functioning as an electrode for the heating means.

2. Apparatus for the molding of heat-moldable plastic material comprising in combination a loader, a molding press, heating means including spaced electrodes for a high frequency electrostatic field and intermediate the loader and the press, a carrier traversing between the loader and the press and through the field, a circuit including a motor, mechanism connecting the motor and the carrier for causing the traversing movement of the latter, means operable by the carrier for releasing a charge of plastic from the loader to the carrier, a switch at the loader end of the carrier traverse and in the motor circuit for contact by the carrier to close the motor circuit, a second switch and a timer in circuit therewith, said second switch being mounted in the path of the carrier and thrown by the latter when in the electrostatic field for breaking the motor circuit and for setting the timer, said timer operating to again close the motor circuit after a predetermined relay and to continue the carrier traverse into position for unloading the charge from the carrier to the press, and a third switch at the press for contact by the carrier and in circuit with the motor for reversing the motor and the traverse of the carrier back to the loader, the carrier serving to reset the second switch on its return movement.

3. Apparatus for the molding of heat-moldable plastic material comprising in combination a loader, a molding press having a mold cavity therein, heating means including spaced electrodes for a high frequency electrostatic field and intermediate the loader and the press, a carrier comprising a board of low loss insulating material having a charge-receiving cavity and traversing between the loader and the press and through the space between the electrodes, a circuit including a motor, mechanism connecting the motor and the carrier for causing the traversing movement of the latter, means operable by the carrier for releasing a charge of plastic from the loader to the carrier, means operable by the carrier for controlling the motor circuit and the traverse of the carrier from the loader between the spaced electrodes and to the press for unloading of the charge and a stop associated with the press for engaging the carrier to release the charge into the mold cavity.

4. In an apparatus for molding a heat-moldable plastic including a molding press, heating means, and a conveyor for transferring a charge from the heating means to the press, said heating means comprising in combination a pair of spaced electrodes for creating an electrostatic field through which the conveyor passes, and a high frequency source of energy connected to the electrodes, said conveyor comprising in combination a base plate and a board of low loss insulating material provided with a charge-receiving through-cavity and mounted on said plate for closing the cavity, said plate being electrically conductive to function as an electrode for the heating means.

VIRGIL E. MEHARG.
ARTHUR P. MAZZUCCHELLI.
RICHARD E. NICOLSON.

REFERENCES CITED

The following references are of record in the file of this patent:

UNITED STATES PATENTS

| Number | Name | Date |
|---|---|---|
| 1,738,097 | Cooper | Dec. 3, 1929 |
| 1,760,234 | Frederick | May 27, 1930 |
| 2,287,277 | Ryder | June 23, 1942 |
| 2,288,614 | Soubier et al. | Jan. 14, 1941 |
| 2,321,252 | Sayre | June 8, 1943 |
| 2,332,938 | Schmidberger | Oct. 26, 1943 |
| 2,347,971 | Sayre | May 2, 1944 |
| 2,365,849 | Strauss | Dec. 26, 1944 |

FOREIGN PATENTS

| Number | Country | Date |
|---|---|---|
| 517,798 | Great Britain | Feb. 8, 1940 |
| 851,723 | France | Oct. 9, 1939 |

OTHER REFERENCES

Molding with Radio Frequency, by Witty, from Modern Plastics, May 1943.

Certificate of Correction

Patent No. 2,467,440.                                                                April 19, 1949.

VIRGIL E. MEHARG ET AL.

It is hereby certified that errors appear in the printed specification of the above numbered patent requiring correction as follows:

Column 2, line 42, for "econds" read *seconds*; line 49, for "apearance" read *appearance*; column 9, line 23, claim 2, for the word "relay" read *delay*; and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*